(No Model.)
G., J. G. & M. O. REHFUSS.
DENTAL PLUGGER.
No. 264,756. Patented Sept. 19, 1882.
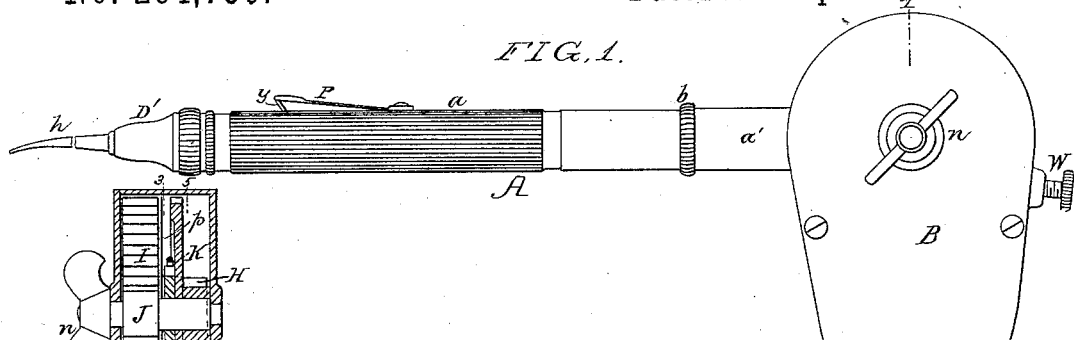
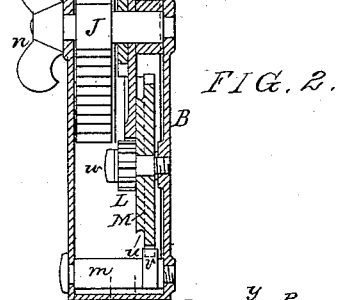
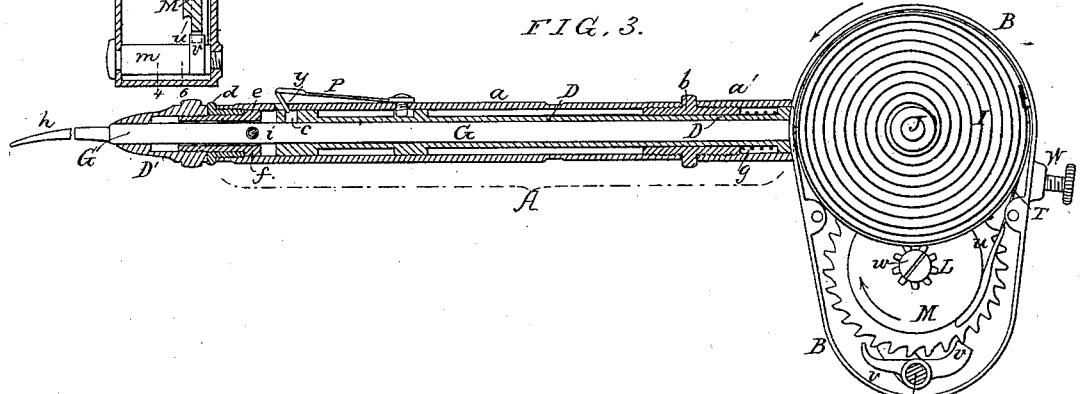
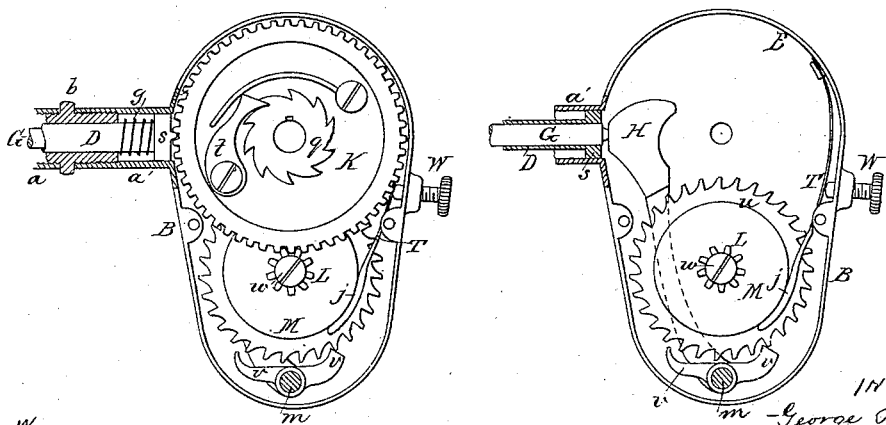
WITNESSES:
Harry Drury
David S. Williams
INVENTORS:
George Rehfuss
J. G. Rehfuss
and M. O. Rehfuss
by their Attorneys
Howson and Sons

UNITED STATES PATENT OFFICE.

GEORGE REHFUSS, J. GEORGE REHFUSS, AND MARTIN O. REHFUSS, OF PHILADELPHIA, PENNSYLVANIA.

DENTAL PLUGGER.

SPECIFICATION forming part of Letters Patent No. 264,756, dated September 19, 1882.

Application filed April 24, 1882. (No model.)

*To all whom it may concern:*

Be it known that we, GEORGE REHFUSS, J. GEORGE REHFUSS, and MARTIN O. REHFUSS, citizens of the United States, and residents of Philadelphia, Pennsylvania, have invented certain Improvements in Dental Plugging-Instruments, of which the following is a specification.

Our invention consists mainly of the combination, in one instrument for plugging teeth and analogous purposes, of a plug-rod with a spring-motor for actuating the same, the detailed construction of the instrument and the special features which we claim as our invention being fully set forth hereinafter.

In the accompanying drawings, Figure 1 is a side view of our improved dental plugger; Fig. 2, a transverse section on the line 1 2, Fig. 1; Fig. 3, a longitudinal section; Fig. 4, a section on the line 3 4, Fig. 2; and Fig. 5, a section on the line 5 6, Fig. 2.

The stem A of the instrument consists, in the present instance, of two tubes, a a', both screwed onto a sleeve, b, the stem being attached to a box or casing, B, containing the hereinafter-described spring-motor and appliances connected therewith. An internal tube, D, can be moved to and fro longitudinally to a limited extent within the stem A, the tube being guided partly by the sleeve b and partly by the interior of the stem, and a plug-rod, G, fitting snugly but so as to be reciprocated freely within the said tube. A collar, d, is screwed into the end of the stem A, and within this collar a sleeve, f, fits freely, the said sleeve being enlarged at one end, so that it cannot be withdrawn outwardly from the stem, owing to the collar d. A pin, i, passes through an opening in the plug-rod, and into or through the enlarged portion of the sleeve f, onto which is screwed the nipple D', the plug-rod passing through the latter and being furnished with a tool, h, which is preferably curved at the end, and which may be similar to the ordinary plugging-tools used by dentists. It will be seen that while the nipple and sleeve are thus confined to the end of the stem A, they, together with the plug-rod, are free to turn independently of the stem, so that the position of the point of the tool h may be changed without turning the entire instrument in the hand by which it is held. The end of the plug-rod G projects a short distance into the casing B, where it can receive the blows of a hammer, H, which is pivoted to the said casing by a pin, m, and which is actuated by a coiled spring, I.

While in carrying out our invention different devices may be employed as mediums through which the coiled spring is caused to operate the hammer, we prefer the mechanism which we will proceed to describe.

The outer end of the coiled spring is attached to the casing B and the inner end to the spindle J, which has its bearings in the opposite sides of the said casing, one end of the spindle being provided with a suitable handle, n, by manipulating which the spring can be wound up. This spring is confined, but so as to be free to act properly, between one side of the casing B and a thin disk, p, which is loose on the spindle; and between this disk and a cog-wheel, K, which is also loose on the spindle, is a ratchet-wheel, q, turning with the said spindle, a spring-pawl, t, pivoted to the cog-wheel K, being adapted to the teeth of the said ratchet-wheel. The cog-wheel K gears into a pinion, L, which, with a pallet-wheel, M, turns on a pin, w, secured to the casing B.

The hammer, where it is pivoted to the pin m, has pallets v v, adapted to the teeth of the pallet-wheel M, the action of the latter on the pallets being similar to that of a like wheel on the pallets of a pendulum in clock-work, and the result of the action of the spring being the very rapid vibration of the hammer, so that when the point of the tool h is pushed against any object the end of the plug-rod will be in a position to be acted on by the hammer.

In order that the spring-motor may be stopped and started by the operator, who holds the stem in his hand, we secure to the said stem a spring, P, having at its outer end an inclined projection, y, which passes through an opening in the stem, and is arranged, by depressing the spring, to enter an orifice, c, in the tube D. As long as the spring P remains in the position shown in Fig. 3 a small projection, s, Fig. 4, on the end of the tube is between two teeth of the cog-wheel K, for a spiral spring, g, intervenes between a collar on the tube and one end of the sleeve b. There can be no movement of the motor as long as the cog-wheel K is thus held; but when the operator places his finger on the spring P and depresses the same the inclined end y of the spring, acting on one end of the orifice c in the tube D, will draw the end of the latter away from the cog-wheel and the action of the instrument will be resumed. The sleeve may be combined with other mechanism for acting on any rotating part of the spring-motor for stopping and releasing the same.

There is a brake-rim, u, on the pallet-wheel M, and a brake-shoe, j, at the end of and forming a part of the elastic arm T, secured to the casing, is caused to bear with more or less force against the said rim, or to be entirely withdrawn therefrom by any adjusting device, a screw, W, passing through the casing, being used in the present case, the application of the brake serving to retard the movement of the wheel and to render the blows of the hammer less rapid and less effective.

We claim as our invention—

1. The combination, in a dental plugging-instrument, of the stem A, the plug-rod G, a pivoted hammer adapted to operate on the plug-rod, a coiled spring and its shaft, a toothed wheel driven by the spring, and connecting mechanism for acting on the hammer, all substantially as set forth.

2. The combination, with the stem and casing or box and the plug-rod G, of the spring I, the pallet-wheel M, mechanism through the medium of which the said wheel is rotated by the spring, the pivoted hammer H, and its pallets v v, substantially as specified.

3. The combination of the stem, casing, and plug-rod with the spring I, spindle J, ratchet q, cog-wheel K and its pawl, pinion L, pallet-wheel M, and hammer H, having pallets adapted to the pallet-wheel, all substantially as described.

4. The combination of the stem A, plug-rod, and a spring-motor for actuating the same with the movable tube D and a device whereby the said tube is caused to lock and release the motor, substantially as described.

5. The combination of the stem A and the cog-wheel K with the tube D, having a projection adapted to the teeth of the wheel, and mechanism whereby the said tube is operated to stop and release the wheel, substantially as described.

6. The combination of the stem A, the tube D, and a spring, g, with the spring P, having an inclined projection, y, for operating on the tube, all substantially as specified.

In testimony whereof we have signed our names to this specification in the presence of two subscribing witnesses.

GEO. REHFUSS.
J. GEO. REHFUSS.
MARTIN O. REHFUSS.

Witnesses:
HARRY DRURY,
HARRY SMITH.